United States Patent
Ponce de Leon et al.

(10) Patent No.: US 11,650,724 B1
(45) Date of Patent: *May 16, 2023

(54) SCHEDULE DENSITY ZOOMING

(71) Applicant: PMA Technologies, LLC, Ann Arbor, MI (US)

(72) Inventors: Gui Ponce de Leon, Ann Arbor, MI (US); Vivek Puri, Scottsdale, AZ (US); Seve Ponce de Leon, Ann Arbor, MI (US); Sergio Ponce de Leon, Ann Arbor, MI (US)

(73) Assignee: PMA TECHNOLOGIES, LLC, Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/737,191

(22) Filed: May 5, 2022

Related U.S. Application Data

(63) Continuation-in-part of application No. 17/585,954, filed on Jan. 27, 2022, now Pat. No. 11,487,415.

(Continued)

(51) Int. Cl.
 G06F 3/04845 (2022.01)
 G06T 11/20 (2006.01)
 (Continued)

(52) U.S. Cl.
 CPC ........ G06F 3/04845 (2013.01); G06F 3/0481 (2013.01); G06Q 10/1097 (2013.01); G06T 11/206 (2013.01); *G06F 2203/04806* (2013.01)

(58) Field of Classification Search
 CPC ...... G06F 16/29; G06F 16/248; G06F 3/0482; G06F 16/288; G06F 16/2246;
 (Continued)

(56) References Cited

U.S. PATENT DOCUMENTS

| | | |
|---|---|---|
| 4,700,318 A | 10/1987 | Ockman |
| 5,016,170 A | 5/1991 | Pollalis et al. |

(Continued)

OTHER PUBLICATIONS

AACE International Recommended Practice No. 29R-03. Forensic Schedule Analysis. TCM Framework: 6.4—Forensic Performance Assessment. Jun. 25, 2007.
AACE International Recommended Practice No. 29R-03. Forensic Schedule Analysis. TCM Framework: 6.4—Forensic Performance Assessment. Jun. 23, 2009.

(Continued)

*Primary Examiner* — Rayeez R Chowdhury
(74) *Attorney, Agent, or Firm* — Carlson, Gaskey & Olds, P.C.

(57) ABSTRACT

A scheduling system and method provides a strategy for an interactive and automated summarized source network schedule on a time-scaled graph of a digital canvas that includes a hierarchy of schedule densities generated from source child activities. As the time-scaled graph is time compressed, the source child activities snap into parent activities of a higher hierarchy level such that the source child activities become visually non-present on the digital canvas and the parent activities of the higher hierarchy level becomes visually present on the digital canvas. As the time-scaled graph is time-stretched, the source child activities that are associated with the parent activities of the hierarchy level that is currently visible on the digital canvas snap out of the parent activities and become visually present on the digital canvas and the parent activities become visually non-present.

19 Claims, 17 Drawing Sheets

Related U.S. Application Data

(60) Provisional application No. 63/184,387, filed on May 5, 2021, provisional application No. 63/167,322, filed on Mar. 29, 2021, provisional application No. 63/142,042, filed on Jan. 27, 2021, provisional application No. 63/142,043, filed on Jan. 27, 2021.

(51) Int. Cl.
*G06Q 10/1093* (2023.01)
*G06F 3/0481* (2022.01)

(58) Field of Classification Search
CPC ............ G06F 3/0481; G06F 16/24578; G06F 16/26; G06F 16/444; G06F 30/392; G06F 3/0485; G06F 40/137; G06F 16/9027; G06F 2115/10; G06F 3/04817; G06F 3/04842; G06F 3/04845; G06F 2203/04806; G06F 3/017; G06F 2203/04808; G06F 3/04847; G06F 3/04883; G06F 12/08; G06F 12/0862; G06F 12/0875; G06F 16/94; G06F 16/9558; G06F 40/143; G06F 40/18; G06F 40/117; G06F 16/93; G06F 40/106; G06F 40/111; G06F 40/174; G06F 40/146; G06F 16/9038; G06F 16/904; G06F 16/986; G06F 3/0483; G06F 40/134; G06F 40/151; G06F 16/2465; G06F 16/285; G06F 16/4393; G06F 16/83; G06F 16/9024; G06F 8/34

See application file for complete search history.

(56) References Cited

U.S. PATENT DOCUMENTS

| | | |
|---|---|---|
| 5,537,524 A | 7/1996 | Aprile |
| 8,249,909 B2 | 8/2012 | Watanabe et al. |
| 2005/0288987 A1 | 12/2005 | Sattler et al. |
| 2006/0044307 A1 | 3/2006 | Song |
| 2006/0069540 A1 | 3/2006 | Krutz |
| 2006/0242419 A1 | 12/2006 | Gaffey et al. |
| 2008/0126945 A1 | 5/2008 | Munkvold et al. |
| 2008/0195452 A1 | 8/2008 | Ponce de Leon |
| 2009/0216602 A1 | 8/2009 | Henderson |
| 2011/0270836 A1* | 11/2011 | Yang .................. G06Q 10/06 707/E17.089 |
| 2017/0323028 A1* | 11/2017 | Jonker ............... G06F 16/9024 |
| 2018/0130146 A1 | 5/2018 | Aghakouchak et al. |

OTHER PUBLICATIONS

AACE International Recommended Practice No. 29R-03. Forensic Schedule Analysis. TCM Framework: 6.4—Forensic Performance Assessment. Apr. 25, 2011.

Ballesteros-Perez, P., del Campo-Hitschfeld, M.L., Gonzalez-Naranjo, M.A., and Gonzalez-Cruz, M.C. (2015). Climate and construction delays; Case study in Chile. Engineering, Construction and Architectural Management, vol. 22 (6). pp. 596-621.

Work Breakdown Structure. Retrieved from: https://www.workbreakdownstructure.com/.

Lepage, M. (2015). The origins of hammocks in project scheduling. Plan Academy. Retrieved from: https://www.planacademy.com/origins-hammocks-project-scheduling/.

Bobby, M. (2010). WBS vs. activity codes: Beyond the obvious. CBA Project Connection. Retrieved from: https://www.cbaprojectconnection.com/wbs-vs-activity-codes-beyond-the-obvious/.

* cited by examiner

Example of Bar Chart Display Used by CPM Applications

Figure 2
Example of Network Information Displayed by the NetPoint/GPM Application

THE GRAPHICAL PATH METHOD ZOOMING UP CONCORDANT SUM-UP LOGIC ALGORITHM (PART I)

| | START & FINISH CHILDREN LINKED IN THE SOURCE SCHEDULE | | | | | | PARENT ACTV'S | | SUM-UP LOGIC BETWEEN PREDECESSOR PARENT AND SUCCESSOR PARENT | | |
|---|---|---|---|---|---|---|---|---|---|---|---|
| | PRED PARENT | | SUCC PARENT | | LOGIC IN SOURCE SCHEDULE | | | | | | |
| | Child | Dur | Child | Dur | Type | Offset | Gap | PRED Dur | SUCC Dur | Type | Offset/Lag | Offset 2 | Gap |
| 1 | FINISH | a | START | b | fs | d | g | A | B | FS | d | -- | g |
| 2 | FINISH | a | START | b | ss | s | g | A | B | SS | A-a+s | -- | g |
| 3 | FINISH | a | START | b | ff | f | g | A | B | FF | B-b+f | -- | g |
| 4 | START | a | START | b | fs | d | g | A | B | SS | a+d | -- | g |
| 5 | START | a | START | b | ss | s | g | A | B | SS | s | -- | g |
| 6 | START | a | START | b | ff | f | g | A | B | SF | a | B-b+f | g |
| 7 | FINISH | a | FINISH | b | fs | d | g | A | B | FF | *d+b | -- | g |
| 8 | FINISH | a | FINISH | b | ss | s | g | A | B | SF | A-s+s | b | g |
| 9 | FINISH | a | FINISH | b | ff | f | g | A | B | FF | f | -- | g |
| 10 | START | a | FINISH | b | fs | d | g | A | B | SF | A+*d | b | g |
| 11 | START | a | FINISH | b | ss | s | g | A | B | SF | s | b | g |
| 12 | START | a | FINISH | b | ff | f | g | A | B | SF | a | f | g |

*Logic Pattern 7, the precedessor's calendar is assigned to the FS ofset "d," and the successor calendar applies to the FF offset "f"
**Logic Pattern 10, the FS ofset "d" calendar remains as in the *source* schedule

Figure 3

Sum-Up Links, Parent Start or Finish Child is Linked To/From Another Parent Start or finish Child

THE GRAPHICAL PATH METHOD ZOOMING UP CONCORDANT SF LINK AVOIDANCE ALGORITHM (PART II)

| | START & FINISH CHILDREN LINKED IN THE SOURCE SCHEDULE ||||||| PARENT ACTV'S || SUM-UP LOGIC BETWEEN PREDECESSOR PARENT AND SUCCESSOR PARENT ||||
|---|---|---|---|---|---|---|---|---|---|---|---|---|---|
| | PRED PARENT || SUCC PARENT || LOGIC IN SOURCE SCHEDULE ||| PRED Dur | SUCC Dur | Type | Offset/Lag | Offset/Lag | Gap |
| | Child | Dur | Child | Dur | Type | Offset | Gap | | | | | | |
| 6 | START | a | START | b | ff | f | g | A | B | SF | a | B-b-f | g |
| | | | | | | | | A1 | A2 | Type | A1 Duration | A2 Duration | 0 |
| | | | | | | | | A1 | B | Type | Lag 1 | Lag 2 | Gap |
| | | | | | | | | A1 | B | FF | B-b-f | N/A | G6 |
| 8 | FINISH | a | FINISH | b | ss | s | g | A | B | SF | A-a+s | b | g |
| | | | | | | | | A1 | A2 | Type | A-A1 | A-A1 | 0 |
| | | | | | | | | A1 | B | Type | Lag 1 | Lag 2 | Gap |
| | | | | | | | | A1 | B | FF | b | N/A | g |
| 10 | START | a | FINISH | b | fs | d | g | A | B | SF | a | b | G10 |
| | | | | | | | | A1 | A2 | Type | A1 Duration | A2 Duration | 0 |
| | | | | | | | | A1 | B | Type | a | A-A1 | Gap |
| | | | | | | | | A1 | B | FF | b | N/A | g |
| 11 | START | a | FINISH | b | ss | s | g | A | B | SF | s | b | G11 |
| | | | | | | | | A1 | A2 | Type | A1 Duration | A2 Duration | 0 |
| | | | | | | | | A1 | B | Type | Lag 1 | A-A1 | Gap |
| | | | | | | | | A1 | B | FF | b | N/A | g |
| 12 | START | a | FINISH | b | ff | f | g | A | B | SF | a | f | G12 |
| | | | | | | | | A1 | A2 | Type | A1 Duration | A2 Duration | 0 |
| | | | | | | | | A1 | B | Type | Lag 1 | A-a | Gap |
| | | | | | | | | A1 | B | FF | f | N/A | g |

Figure 4

Start-to-Finish Link Avoidance Algorithm, Parent Start or Finish Child is Linked To/From Another Parent Start or Finish Child Sum-Up Links, Parent Finish Child Precedes Another Parent Start Child

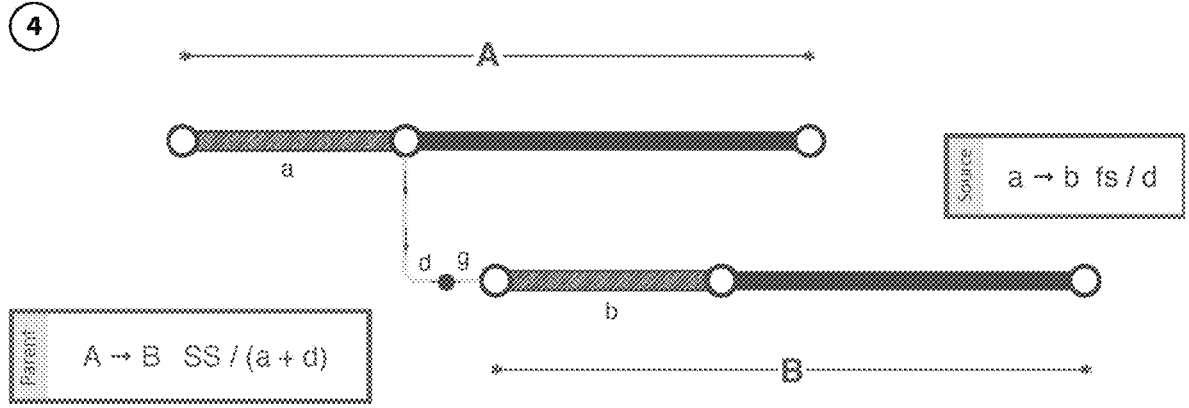
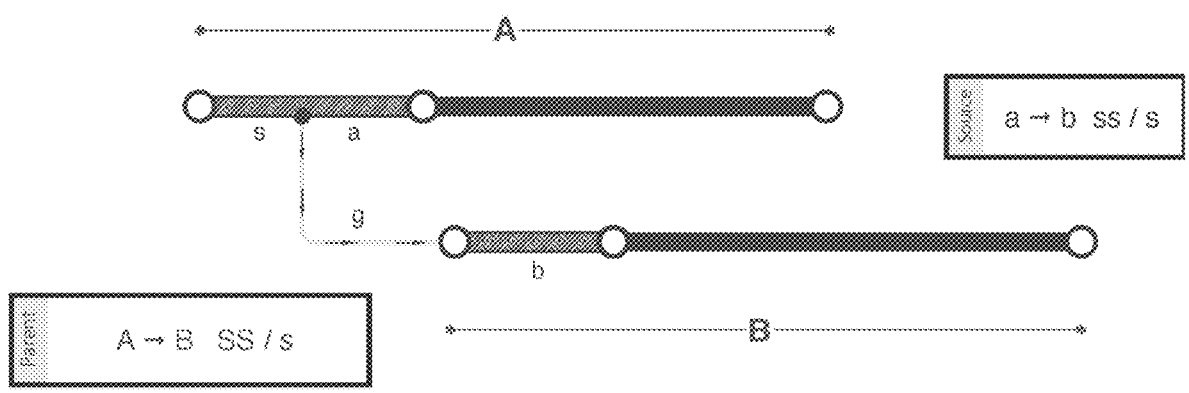
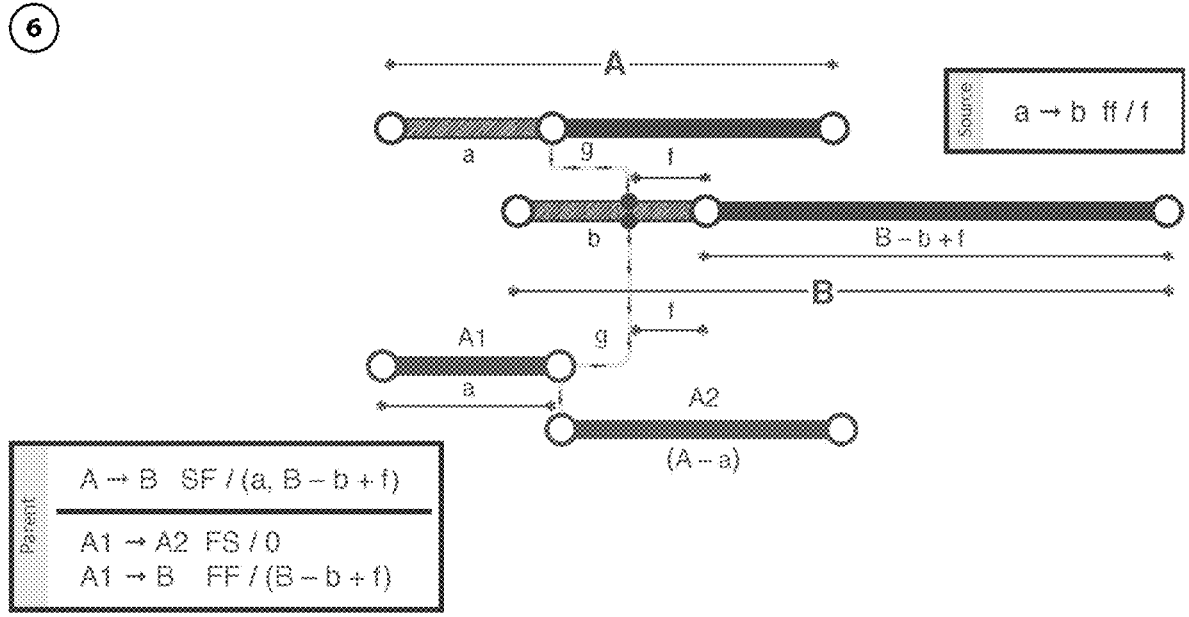
Figure 6
Sum-Up Links, Parent Start Child Precedes Another Parent Start Child Sum-Up Links, Parent Finish Child Precedes Another Parent Finish Child

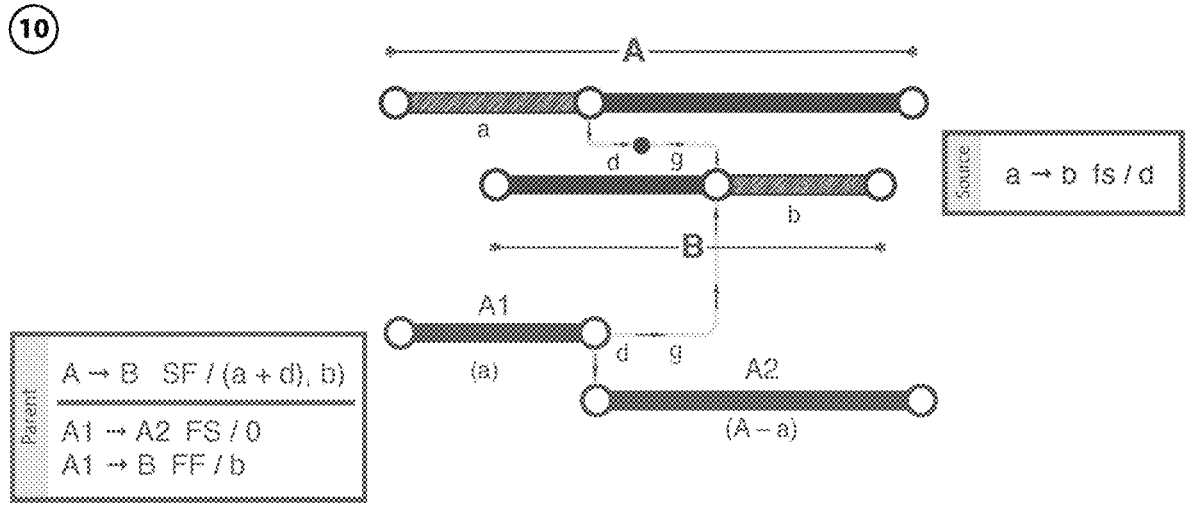
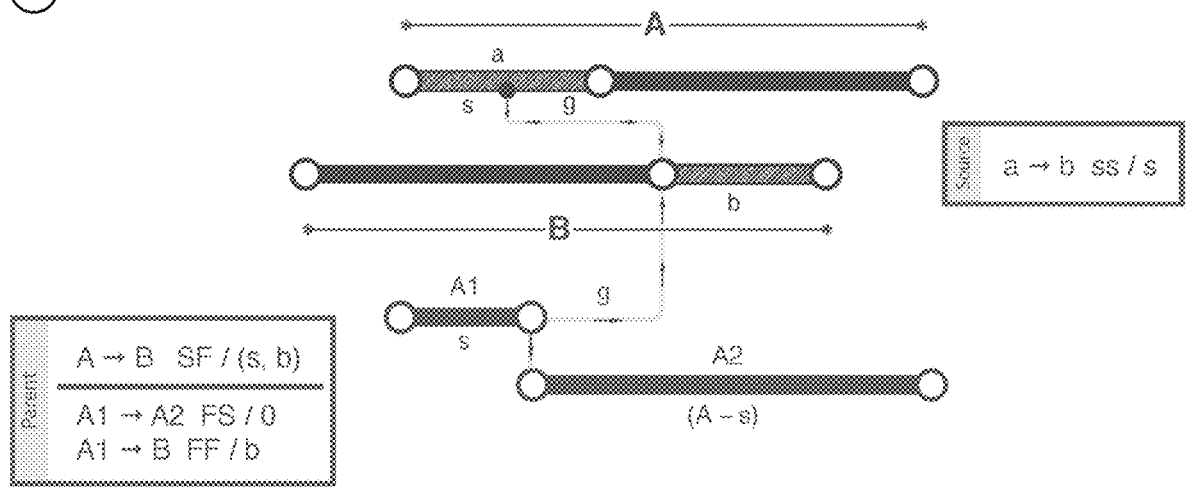
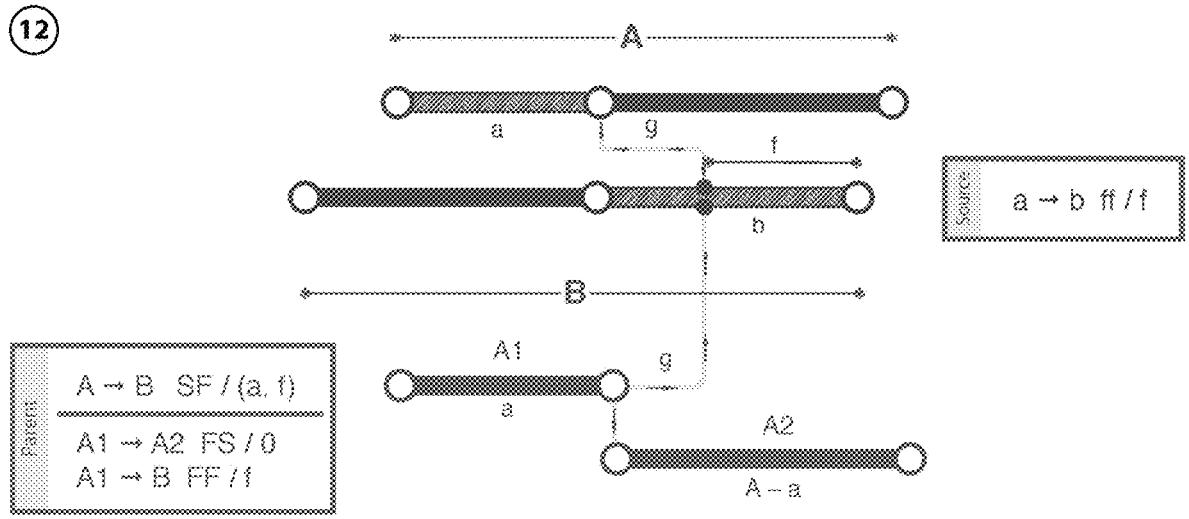
Figure 8
Sum-Up Links, Parent Start Child Precedes Another Parent Finish Child

THE GRAPHICAL PATH METHOD ZOOMING UP CONCORDANT SUM-UP LOGIC ALGORITHM (PART III)

| | LINK WITH INTERMEDIATE CHILD IN THE SOURCE SCHEDULE | | | | | | | | | PARENT ACTV'S | | ROLL-UP LOGIC from PREDECESSOR PARENT to SUCCESSOR PARENT | | | |
|---|---|---|---|---|---|---|---|---|---|---|---|---|---|---|---|
| | PRED PARENT | | | SUCC PARENT | | | LINK IN SOURCE SCHEDULE | | | PRED | SUCC | | | | |
| | Child | Dur | α | β | Child | Dur | β | Type | Offset | Gap | Dur | Dur | Type | Offset/Lag | Offset 2 | Gap |
| 1 | FINISH | a | | | INTERM | m | β | fs | d | g | A | B | FF | d+m+β | -- | g |
| 2 | FINISH | a | | | INTERM | m | β | ss | s | g | A | B | SF | A-a+s | m+β | g |
| 3 | FINISH | a | | | INTERM | m | β | ff | f | g | A | B | FF | f+β | -- | g |
| 4 | INTERM | m | | β | FINISH | b | β | fs | d | g | A | B | SF | A-β | d+b | g |
| 5 | INTERM | m | | β | FINISH | b | β | ss | s | g | A | B | SF | A-β-m+s | b | g |
| 6 | INTERM | m | | β | FINISH | b | β | ff | f | g | A | B | SF | A-β | f | g |
| 7 | START | a | | β | INTERM | m | β | fs | d | g | A | B | SF | a | d+m+β | g |
| 8 | START | a | | β | INTERM | m | β | ss | s | g | A | B | SF | s | m+β | g |
| 9 | START | a | | β | INTERM | m | β | ff | f | g | A | B | SF | β | f+β | g |
| 10 | INTERM | m | α | | START | b | | fs | d | g | A | B | SS | α+m+d | -- | g |
| 11 | INTERM | m | α | | START | b | | ss | s | g | A | B | SS | α+s | -- | g |
| 12 | INTERM | m | α | | START | b | | ff | f | g | A | B | SF | α+m | f+β | g |

α is days, using the intermediate activity calendar, to the start of its parent activity
β is days, using the intermediate activity calendar, to the finish of its parent activity Figure 9
Sum-Up Links, Parent Start or Finish Child is Linked To/From Another Parent Intermediate Child

THE GRAPHICAL PATH METHOD ZOOMING UP CONCORDANT SF LINK AVOIDANCE ALGORITHM — 5/8 CASES (PART IV)

| | LINK FROM/TO INTERMEDIATE CHILD IN THE SOURCE SCHEDULE | | | | | | | | PARENT ACTV'S | | | SUM-UP LOGIC BETWEEN PREDECESSOR PARENT AND SUCCESSOR PARENT | | |
|---|---|---|---|---|---|---|---|---|---|---|---|---|---|---|
| | PRED PARENT | | | SUCC PARENT | | | LINK IN SOURCE SCHDULE | | | PRED | SUCC | | | |
| | Child | Dur | β | Child | Dur | β | Type | Offset | Gap | Dur | Dur | Type | Offset/Lag | Gap |
| 2 | FINISH | a | β | INTERM | m | β | ss | s | g | A | B | SF | A-a+s | g |
| | | | | | | | | | | A1 | A2 | Type | A1 Duration | Gap |
| | | | | | | | | | | | | FS | A-a+s | 0 |
| | | | | | | | | | | | | Type | Lag 1 | Gap |
| | | | | | | | | | | | | FF | m-β | G6 |
| 4 | INTERM | m | β | FINISH | b | β | fs | d | g | A | B | SF | A-β | g |
| | | | | | | | | | | A1 | A2 | Type | A1 Duration | Gap |
| | | | | | | | | | | | | FS | A-β | 0 |
| | | | | | | | | | | | | Type | Lag 1 | Gap |
| | | | | | | | | | | | | FF | d+b | g |
| 5 | INTERM | m | β | FINISH | b | β | ss | s | g | A | B | SF | A-β-m+s | g |
| | | | | | | | | | | A1 | A2 | Type | A1 Duration | Gap |
| | | | | | | | | | | | | FS | A-β-m+s | 0 |
| | | | | | | | | | | | | Type | Lag 2 | Gap |
| | | | | | | | | | | | | FF | b | g |
| 6 | INTERM | m | β | FINISH | b | β | ff | f | g | A | B | SF | A-β | G11 |
| | | | | | | | | | | A1 | A2 | Type | A1 Duration | Gap |
| | | | | | | | | | | | | FS | A-β | 0 |
| | | | | | | | | | | | | Type | Lag 2 | Gap |
| | | | | | | | | | | | | FF | f | g |
| 7 | START | a | β | INTERM | m | β | fs | d | g | A | B | SF | a | G12 |
| | | | | | | | | | | A1 | A2 | Type | A1 Duration | Gap |
| | | | | | | | | | | | | FS | a | 0 |
| | | | | | | | | | | | | Type | Lag 2 | Gap |
| | | | | | | | | | | | | FF | d+m+β | g |

β is days, using the intermediate activity calendar, to the finish of its parent activity

Figure 10

Start-to-Finish Link Avoidance Algorithm, Parent Start or Finish Child Is Linked To/From Another Parent Intermediate Child Sum-Up Links, Parent Finish Child Precedes Another Parent Intermediate Child Sum-Up Links, Parent Intermediate Child Precedes Another Parent Finish Child

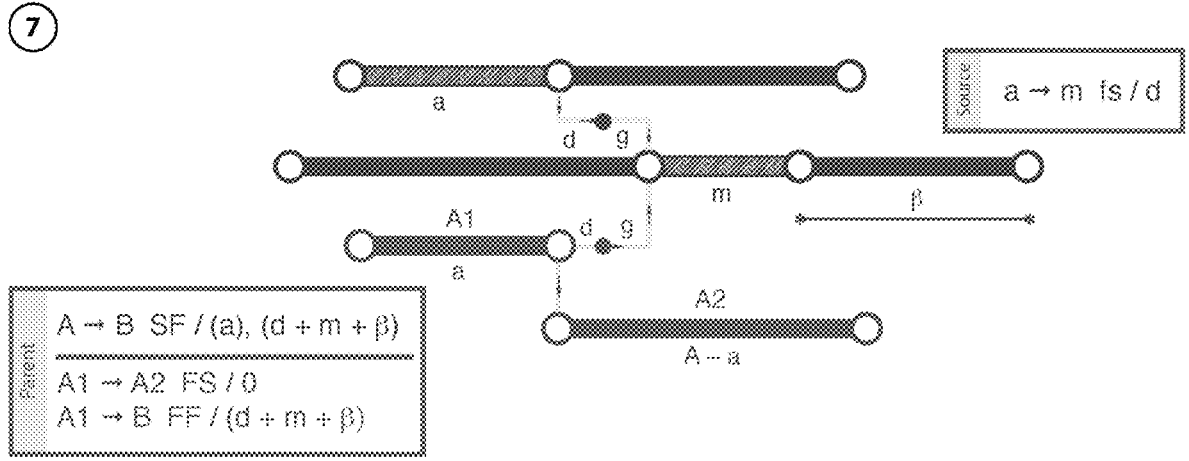
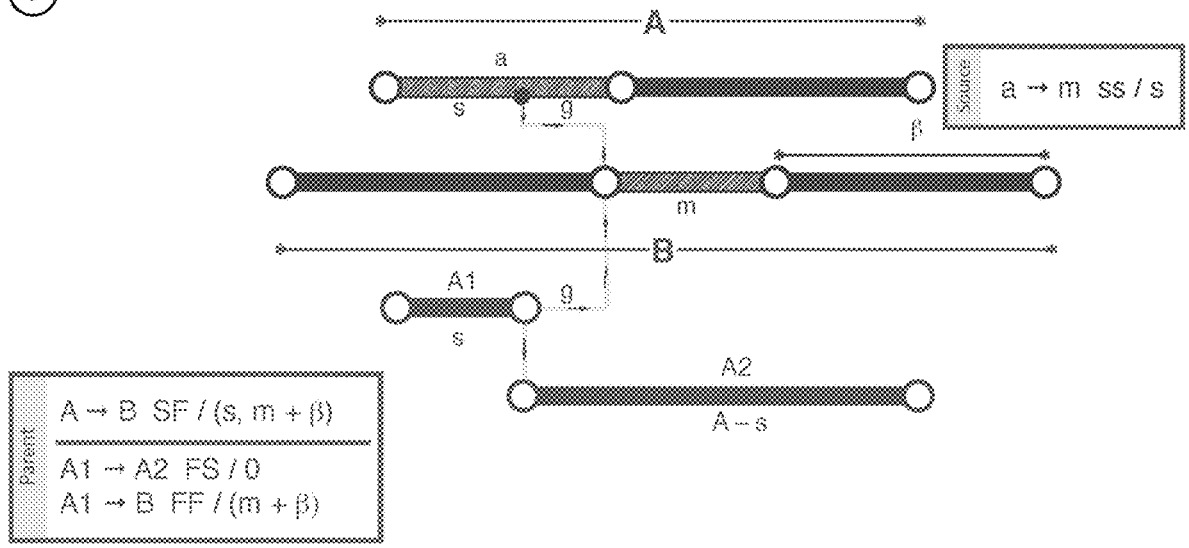
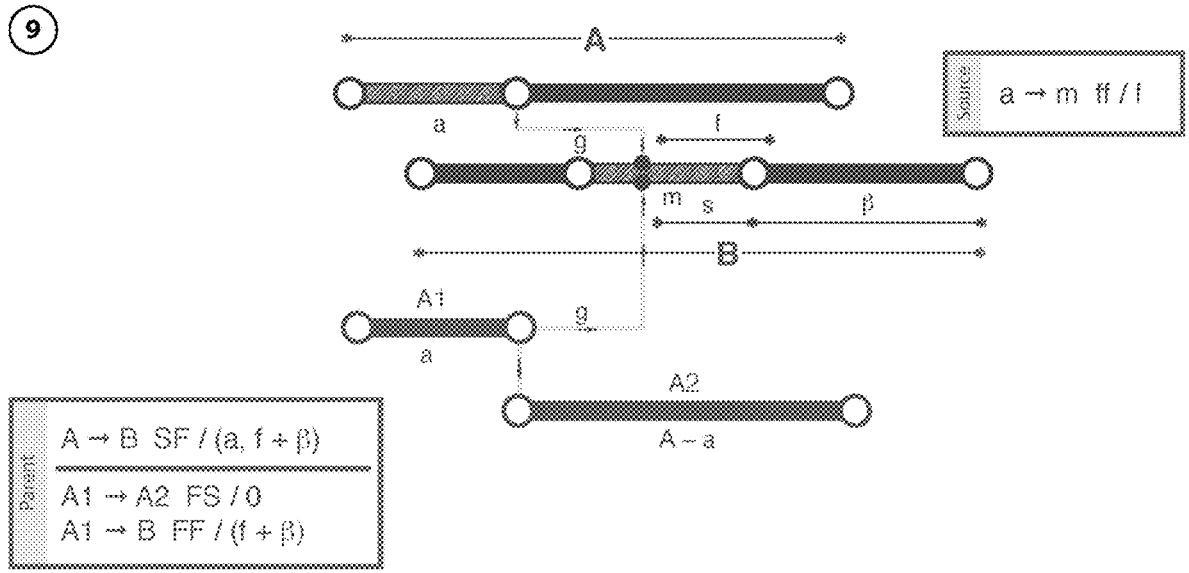
Figure 13
Sum-Up Links, Parent Start Child Precedes Another Parent Intermediate Child

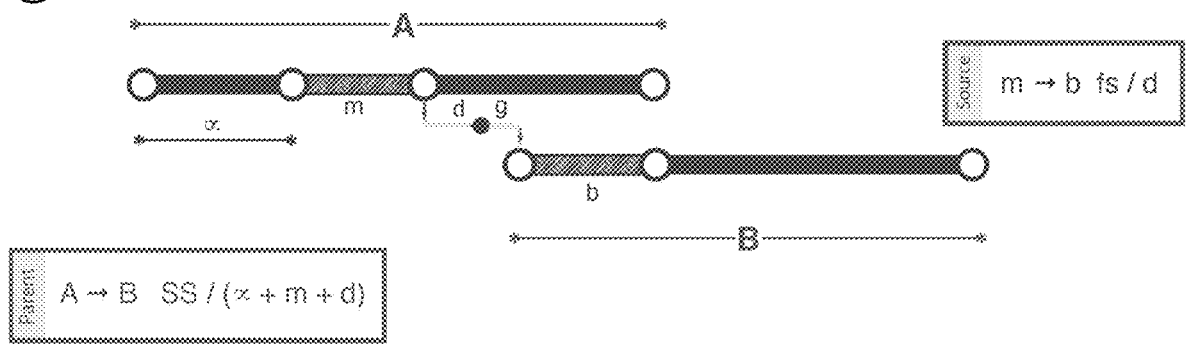
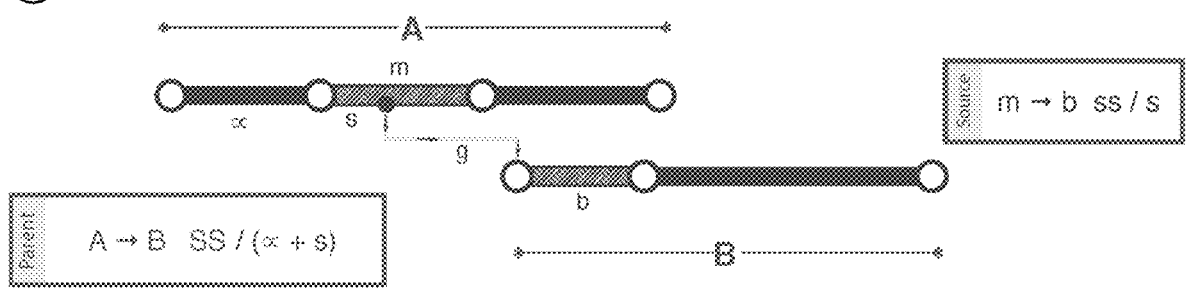
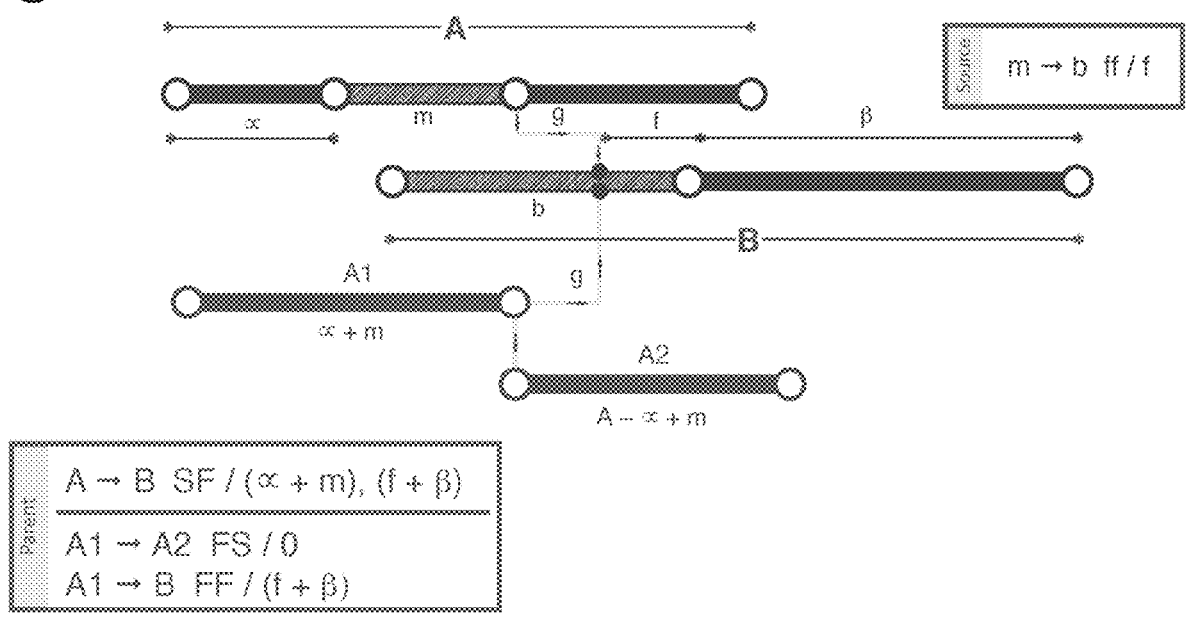
Figure 14
Sum-Up Links, Parent Intermediate Child Precedes Another Parent Start Child

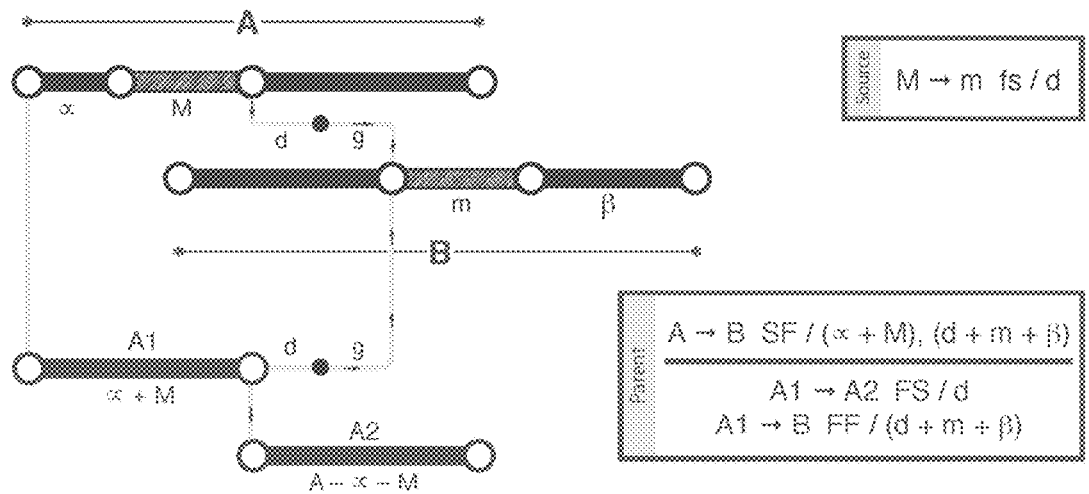
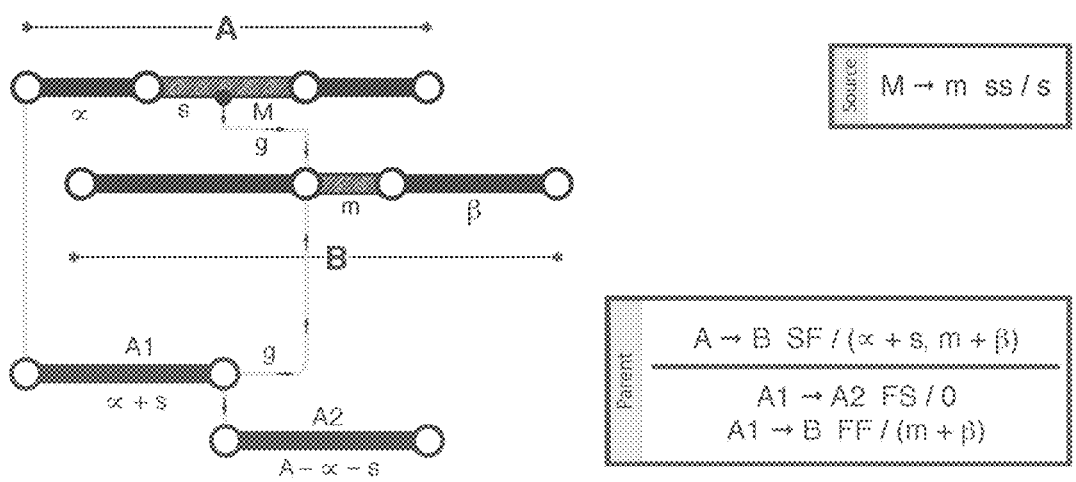
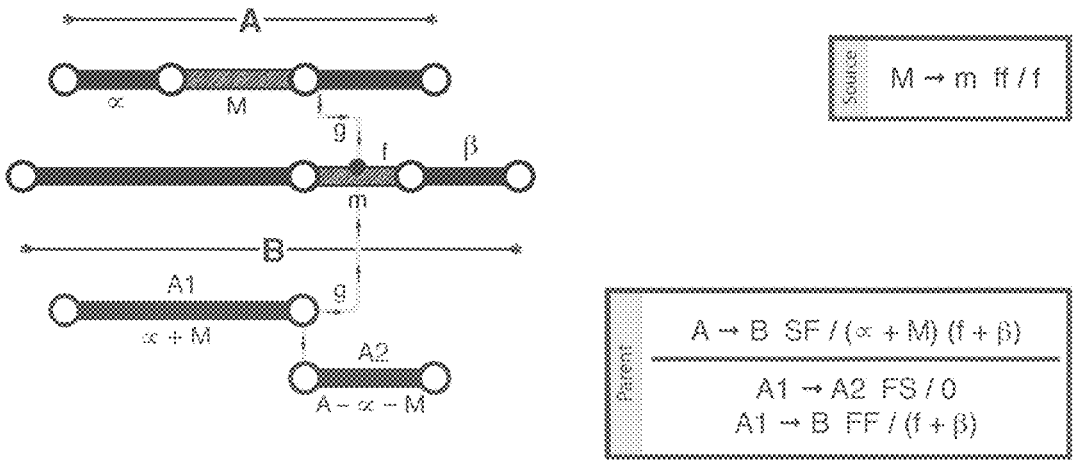
Figure 15
Sum-Up Links, Parent Middle Child Precedes Another Parent Intermediate Child

THE GRAPHICAL PATH METHOD ZOOMING UP CONCORDANT LINK ALGORITHM MIDDLE CHILD —(PART V)

| | LINK FROM MIDDLE TO INTERMEDIATE CHILD IN THE SOURCE SCHEDULE | | | | | | | | | PARENT ACTV'S | | SUM-UP LOGIC BETWEEN PREDECESSOR PARENT AND SUCCESSOR PARENT | | |
|---|---|---|---|---|---|---|---|---|---|---|---|---|---|---|
| | PRED PARENT | | | SUCC PARENT | | | LINK IN SOURCE SCHEDULE | | | PRED | SUCC | | | |
| | Child | Dur | α | Child | Dur | β | Type | Offset | Gap | Dur | Dur | Type | Offset/Lag | Offset/Lag | Gap |
| 13 | MIDDLE | M | α | INTERM | m | β | fs | d | g | A | B | SF | α+M | d+m+β | g |
| | | | | | | | | | | A1 | A2 | Type | A1 Duration | A2 Duration | |
| | | | | | | | | | | | | FS | α+M | A-α-M | 0 |
| | | | | | | | | | | | | Type | Lag 1 | Lag 2 | Gap |
| | | | | | | | | | | | | FF | d+m+β | N/A | G6 |
| 14 | MIDDLE | M | α | INTERM | b | β | ss | s | g | A | B | SF | α+s | m+β | g |
| | | | | | | | | | | A1 | A2 | Type | A1 Duration | A2 Duration | Gap |
| | | | | | | | | | | | | FS | α+s | m+β | 0 |
| | | | | | | | | | | | | Type | Lag 1 | Lag 2 | Gap |
| | | | | | | | | | | | | FF | m+β | N/A | g |
| 15 | MIDDLE | m | α | INTERM | b | β | ff | f | g | A | B | SF | α+M | f+β | g |
| | | | | | | | | | | A1 | A2 | Type | A1 Duration | A2 Duration | Gap |
| | | | | | | | | | | | | FS | α+M | A-α-M | 0 |
| | | | | | | | | | | | | Type | Lag 1 | Lag 2 | Gap |
| | | | | | | | | | | | | FF | f+β | N/A | g |

α is days, using the middle activity calendar, from start of its parent activity to the start of middle child
β is days, using the intermediate activity calendar, from finish of intermediate child to finish of its parent activity Patent Pending—Not For Disclosure          ©2020-2021 PMA Consultants, LLC          3-Jul-21

Figure 16

Start-to-Finish Link Avoidance Algorithm, Parent Middle Child is Linked To/From Another Parent Intermediate Child Example Block Diagram Detailing Sum-up Links for Milestones and Benchmarks

SCHEDULE DENSITY ZOOMING

COPYRIGHT NOTICE

The copyright owner has no objection to the facsimile reproduction by anyone of the patent document of the patent disclosure as it appears in the Patent and Trademark Office patent file or records but reserves all copyright rights whatsoever.

BACKGROUND

Scheduling a large project with many project activities is a complex endeavor. Once completed, the project schedule is used in project management and at various intervals to assess progress, identify problems, make schedule adjustments as activities are completed and the schedule progress is updated, and communicate the schedule to stakeholders and management audiences.

The many project activities in the detailed schedule for a large project can be grouped into multiple hierarchical schedule levels, wherein the top level is a summary of the next lower level, and so forth. Most commonly, level 1 at the top of the hierarchical pyramid is the highest schedule level, and level 5 at the bottom of the pyramid is the lowest schedule level. In general, a "higher-level" schedule level means less detail about the individual schedule activities and a "lower-level" schedule level means more detail about the individual schedule activities.

To create schedules at higher levels using scheduling software, activities and events in the detailed schedule are associated with grouping activities structured in a level of indenture, examples including work breakdown structure (WBS) packages, hammocks, and level codes. The resulting summarized schedules, however, are conventional bar charts without logic ties between the summarized activities. Lack of logic ties in such software-generated summarized bar chart schedules disallows the computation of total floats and critical paths and limits the utility of the summaries.

Manually adding logic between summary activities, based on the underlying detailed logic ties, an option offered in some software, is an arduous task even to experienced schedulers—not to mention an impractical option as it must be repeated each time the detailed schedule is revised.

SUMMARY

A scheduling system and method therefor according to examples of the present disclosure provide a strategy for an interactive and automated summarized source network schedule on a time-scaled graph and displayable on a digital canvas that includes a hierarchy of logic-tied schedule densities generated from source child activities and for which there is the ability in real-time to zoom in/out among the schedule densities. As the time-scaled graph is time compressed (zoom out), the source child activities snap into parent activities of a higher one of the hierarchy levels such that the source child activities become visually non-present on the digital canvas and the parent activities of the higher one of the hierarchy levels becomes visually present on the digital canvas. As the time-scaled graph is time-stretched (zoom in), the source child activities that are associated with the parent activities of the hierarchy level that is currently visible on the digital canvas snap out of the parent activities and become visually present on the digital canvas and the parent activities become visually non-present.

BRIEF DESCRIPTION OF THE DRAWINGS

This disclosure may be better understood with reference to the following drawings and description. The figures are not necessarily to scale, emphasis instead being placed upon illustrating the principles of the disclosure. In the figures, like referenced numerals designate corresponding parts throughout the different views.

FIG. 2 illustrates an example of the network information displayed by the NetPoint GPM application in a time-dependent Logic Diagramming Method network layout.

FIG. 3 portrays a spreadsheet detailing the 12 sum-up logic patterns that arise where a parent start or finish child is linked to/from another parent start or finish child.

FIG. 4 portrays a spreadsheet detailing the sum-up SF link avoidance algorithm for cases where a parent start or finish child is linked to/from another parent start child and finish child.

FIG. 6 graphs the three sum-up logic patterns that arise where a parent start child precedes another parent start child.

FIG. 8 graphs the three sum-up logic patterns that arise where a parent start child precedes another parent finish child.

FIG. 9 portrays a spreadsheet detailing the 12 sum-up logic patterns that arise where a parent start child or finish child is linked to/from another parent intermediate child.

FIG. 10 portrays a spreadsheet detailing the sum-up SF link avoidance algorithm for cases where a parent start or finish child is linked to/from another parent intermediate child.

FIG. 13 graphs the three sum-up logic patterns that arise where a parent start child precedes another parent intermediate child.

FIG. 14 graphs the three sum-up logic patterns that arise where a parent intermediate child precedes another parent start child.

FIG. 15 graphs the three sum-up logic patterns from/to a parent middle child and another parent intermediate child.

FIG. 16 portrays a spreadsheet detailing the sum-up SF link avoidance algorithm where a parent middle child is linked to/from another parent intermediate child.

DETAILED DESCRIPTION

A project schedule application allows a user to schedule activities associated with a project. For example, the application allows a user to input a network of activities, milestones, and "links" (logic ties connecting activities and milestones). The schedule application performs calculations using algorithmic rules and allows a user to generate an output display of the schedule.

Using algorithmic network rules, such as critical path method ("CPM") or graphical path method ("GPM"), a project schedule application calculates early start dates, early finish dates, late start dates, late finish dates, and total floats, and in the case of GPM, floats and drifts. Whereas CPM relies on forward pass (early dates) and backward pass (late dates) algorithms to calculate total floats as activity late dates less early dates, GPM calculates all float attributes from link gaps.

A change to the schedule in a CPM application causes a complete recalculation of the entire schedule. GPM embodies a paradigm shift from CPM in that GPM applications refresh the network information and the schedule display in a graphical rheonomic network on the computer or tablet screen synchronously, and only where impacted, as a user makes changes to the schedule by adding activities, links, and/or events, revising activity durations, links, and/or events, or by manipulating activities, links, milestones, and/or benchmarks.

Figure 1:
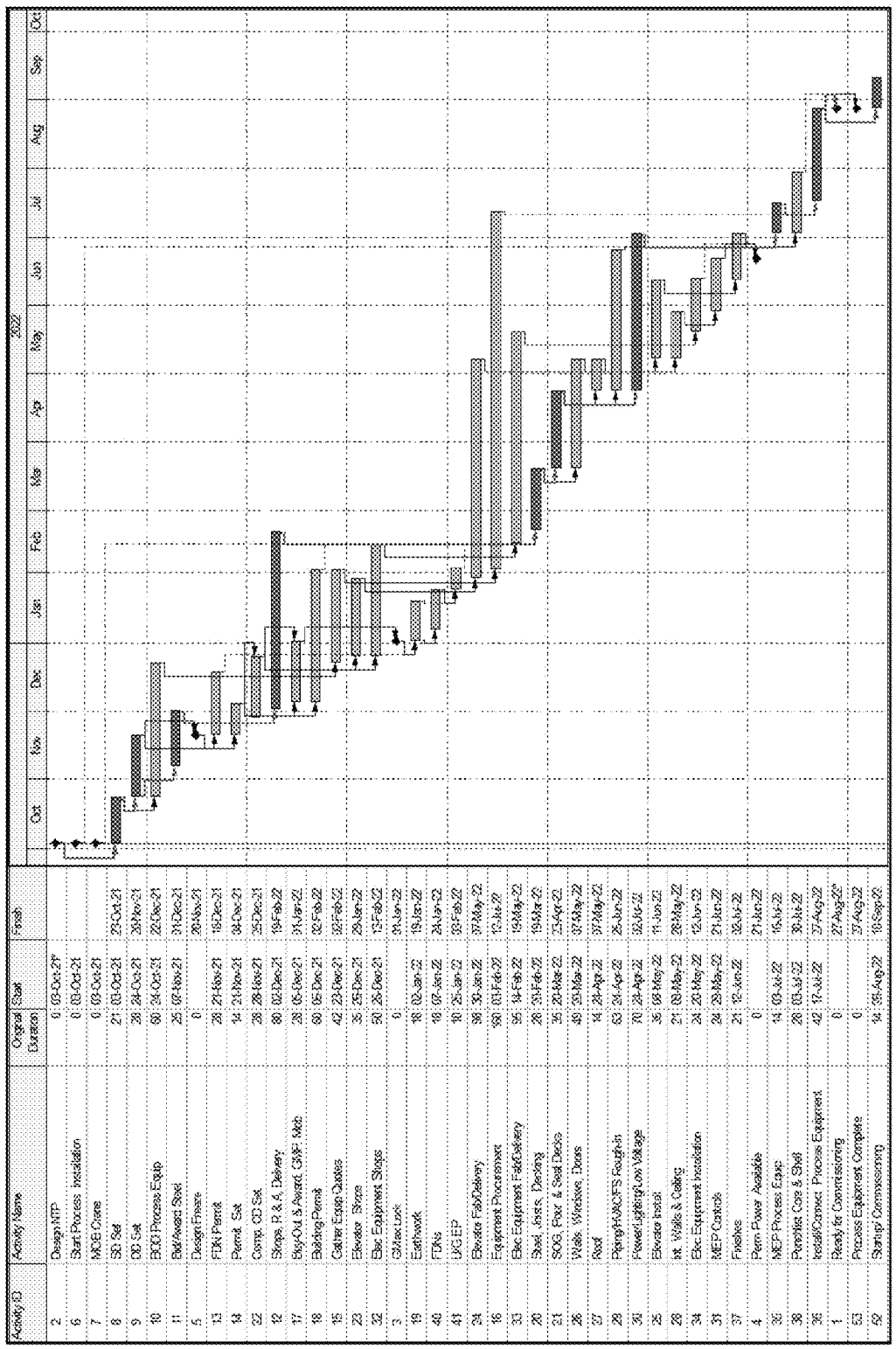
FIG. 1 illustrates an example of the bar chart display used by CPM applications.
Figure 5:
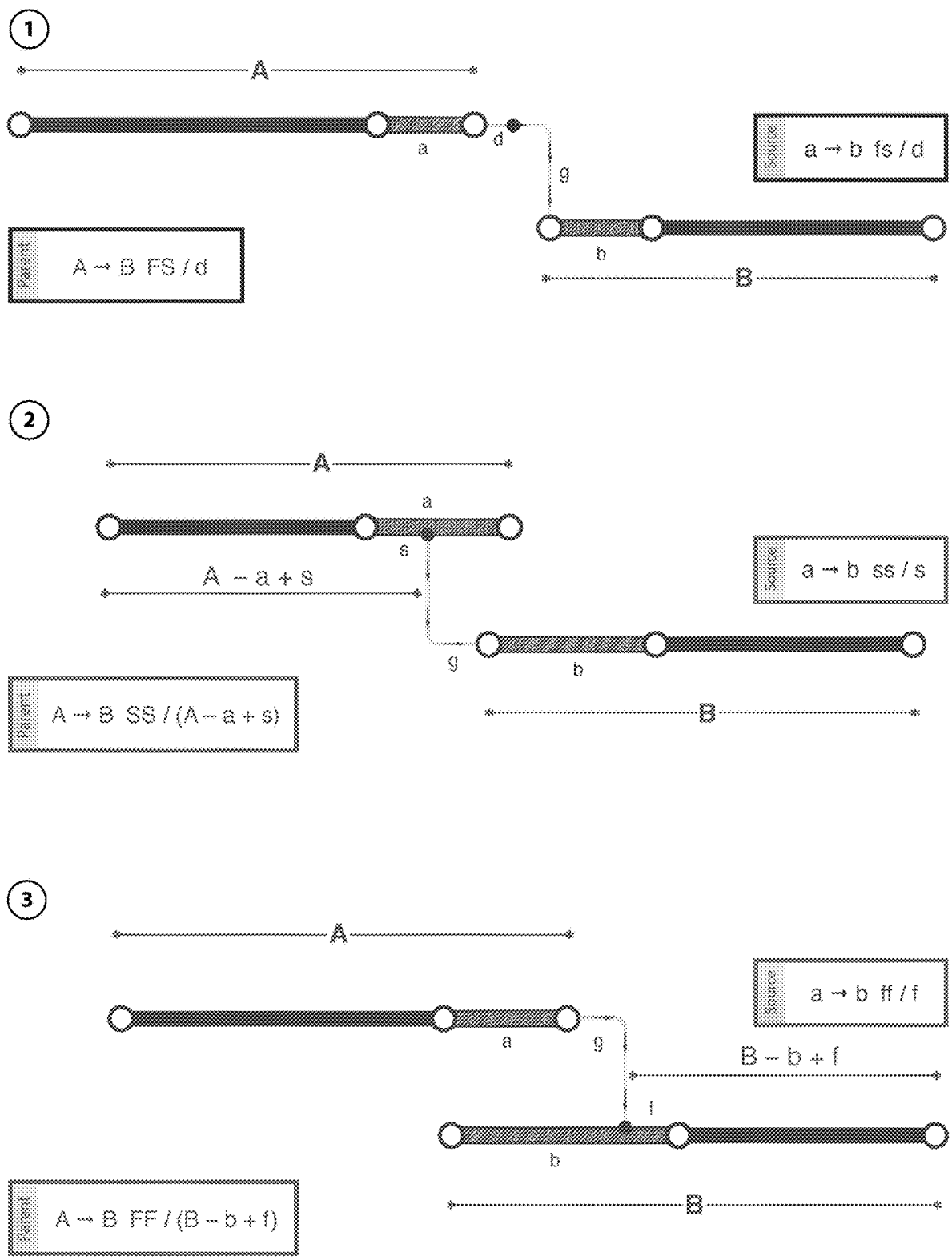
FIG. 5 graphs the three sum-up logic patterns that arise where a parent finish child precedes another parent start child.
Figure 7:
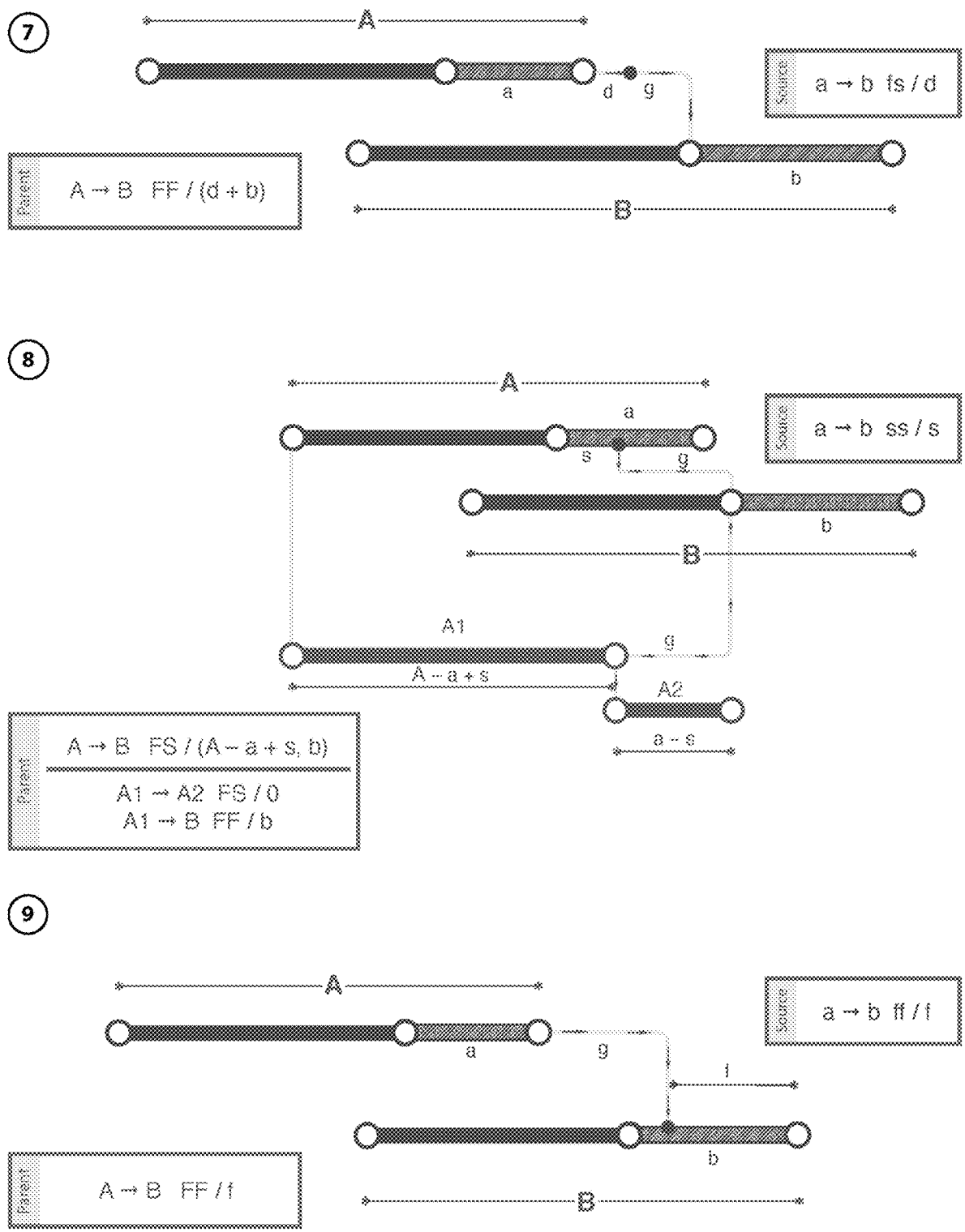
FIG. 7 graphs the three sum-up logic patterns that arise where a parent finish child precedes another parent finish child.
Figure 11:
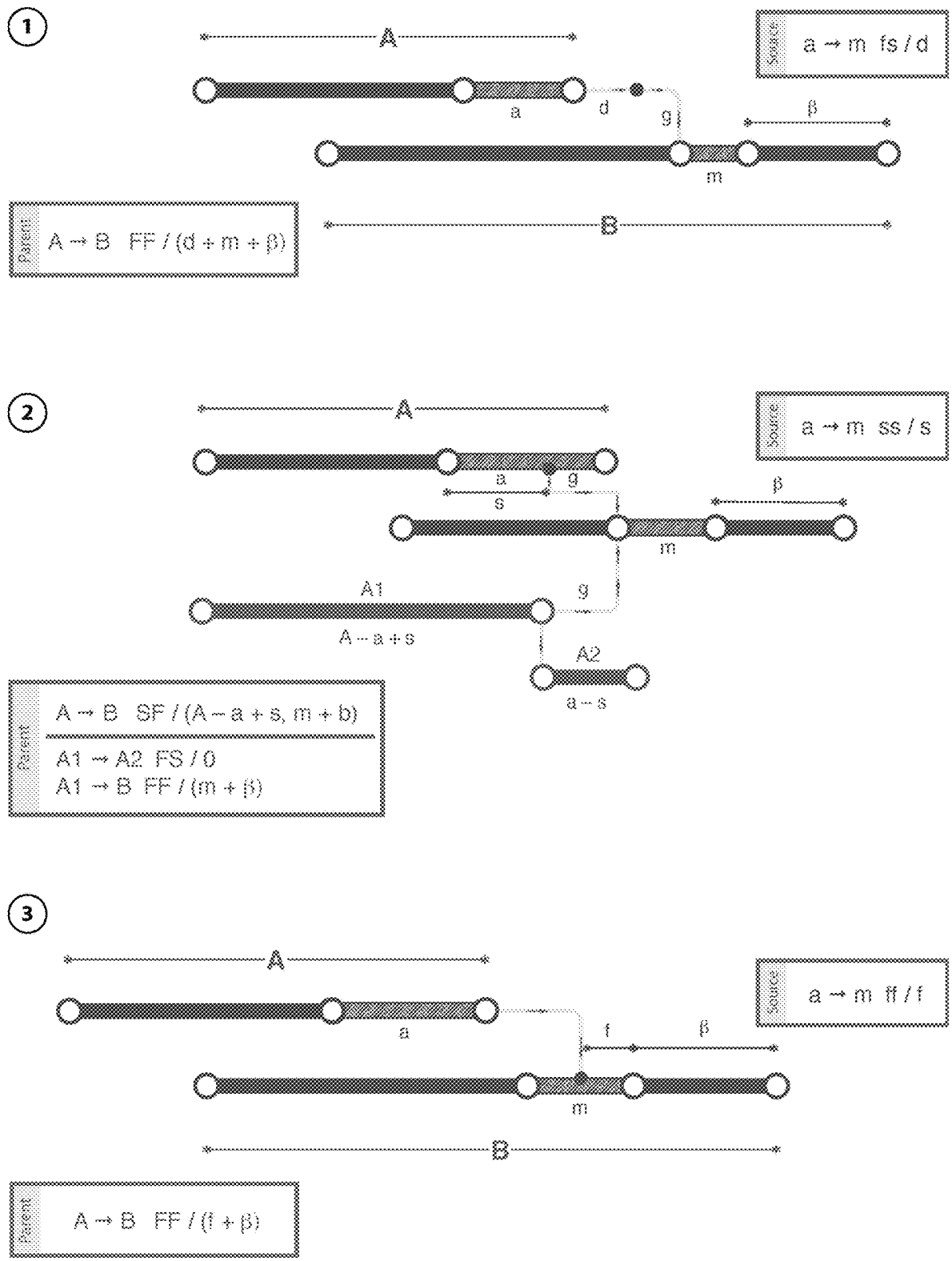
FIG. 11 graphs the three sum-up logic patterns that arise where a parent finish child precedes another parent intermediate child.
Figure 12:
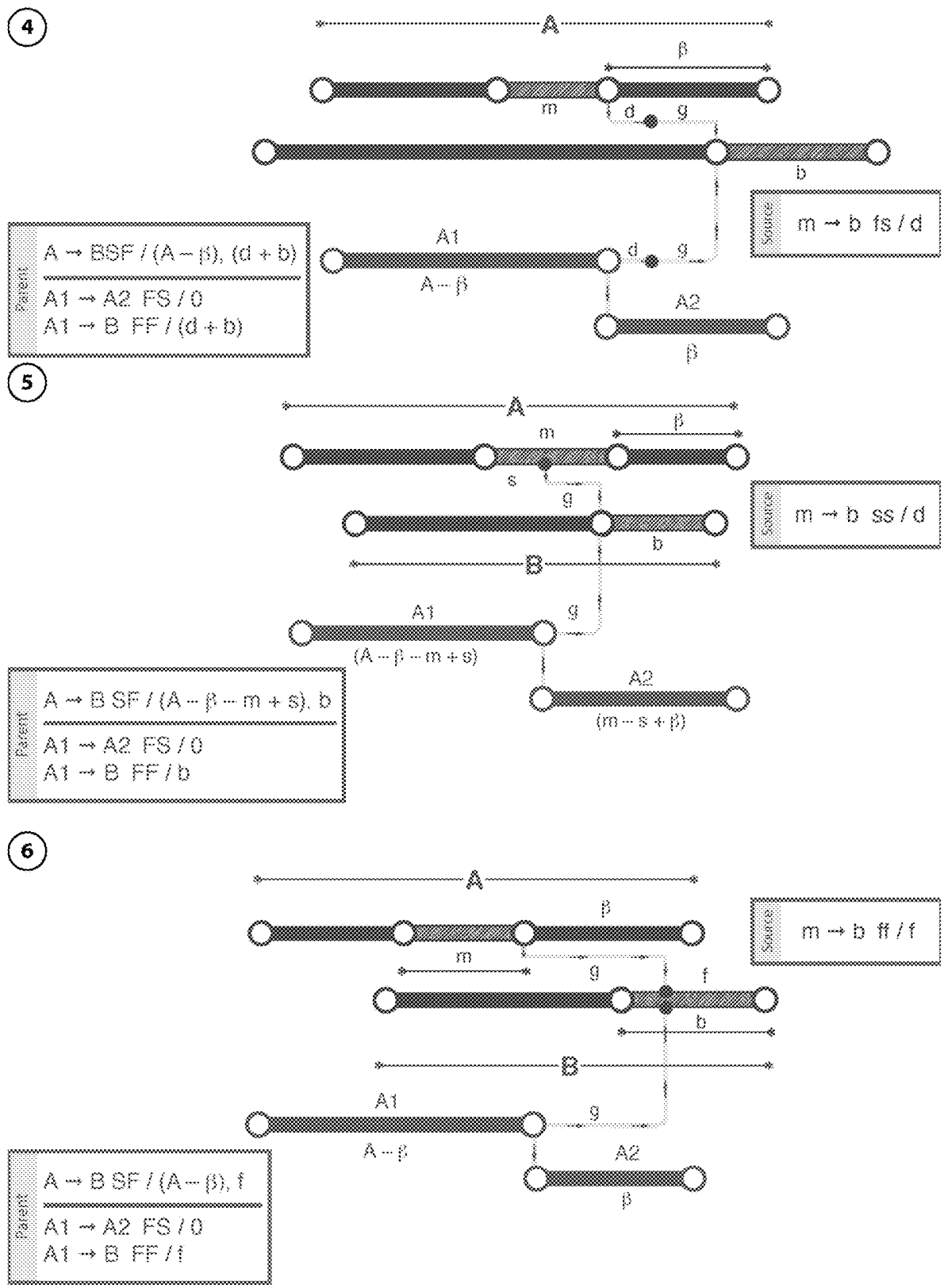
FIG. 12 graphs the three sum-up logic patterns that arise where a parent intermediate child precedes another parent finish child.

Oracle Primavera/P6 and Microsoft Project/MSP are two well-known CPM schedule applications. An example of the bar chart display and print outs predominantly used by CPM applications is provided in FIG. 1. NetPoint,® NetRisk,™ and Project Summit™ are examples of GPM-based schedule applications. An example of the activity/logic network information displayed in a time dependent graphical layout by the NetPoint GPM application is provided in FIG. 2.

Schedule applications allow detailed activities and milestones to be associated with summarized schedules by manually creating hierarchical WBS packages, hammocks, or schedule level codes (collectively referred to as "summary groups") consistent with the intended schedule levels and coding activities to the summary groups. In current art, the derived summarized schedules are mere static bar charts, devoid of total floats and critical path/s, where each summary group is shown as a bar without the logic ties that interconnect its underlying activities and milestones.

A schedule application summarizing feature that "sums up" activities to summary groups provides vertical integration and traceability between the detailed and summarized schedules, as the earliest start date and the latest finish date of the individual activities so grouped necessarily sum up to the start date and finish date of their respective summary group. Without logic ties summing up to higher-level summary groups, a summarized schedule lacks horizontal traceability, cannot be used to perform schedule calculations using network rules, and is useless for conveying the plan to upper management and undertaking what-if analyses.

Revisions to a schedule that become apparent when reviewing a summarized static bar chart have to be carried out in the source schedule portraying detailed activities and logic ties, each session resulting in the schedule application displaying a revised summary static bar chart.

In this regard, the present disclosure provides a strategy for an interactive and automated schedule summarization on a digital canvas that includes a hierarchy of logic-tied schedule densities generated from activities and logic of a source network schedule and for which there is the ability in real time to zoom in/out among the hierarchy of logic-tied schedule densities. For example, the hierarchy of logic-tied schedule densities is generated in response to and as the timescale or grid spacing is compressed. The following definitions may be useful in understanding this disclosure.

activity: network object denoting a task that must be performed, a time-consuming schedule restraint, or a delay denoting the effect on timing from what was planned.

ad hoc zooming out: generating in real time a lower-density schedule, cluster by cluster, as clusters of activities are selected by the user or, based on learned factors, by the software.

auto zooming: toolless zooming up that occurs as the timescale or grid spacing is compressed if any fragnet is no longer discernible and, on the other hand, zooming back in to the higher-density fragnet that occurs if action on the timescale or grid spacing reverts to stretching.

benchmark: network object denoting a fixed start or completion event (occurs in an instant) that has zero total float and that is used to model an overarching milestone.

child: activity in a source network schedule that, by virtue of its association with a WBS package, hammock, level code, or selected cluster, is subsumed into the parent activity generated at the corresponding level in the hierarchy of schedule densities.

digital canvas: computerized surface upon which the network schedule of graphical schedule objects and logic links are displayed.

cluster: schedule fragnet grouped into a parent activity in ad-hoc zooming out.

concordant schedules: early start and finish dates, total floats, links, gaps, milestones, benchmarks, and critical paths sum up from the lower-level schedule into the higher-level schedule.

critical path method (CPM): algorithm for scheduling a set of project activities that determines the longest path of activities and the time required to complete them from start to finish.

data date: date that splits an updated schedule between a statused (as-built) portion left of the data date and a forecasted portion right of the data date.

density: defines schedule hierarchical level of detail; a higher-density schedule portrays, for the same scope of work, more activities than a lower-density schedule.

density zooming: from a source network schedule, algorithmically generating a lower-density schedule at the designated level or as a cluster is selected; also, generated lower-density (or higher-density) schedule as the timescale or grid spacing is gradually compressed (or stretched).

drift: extent an activity may gain schedule (e.g., shift or extend back to an earlier position) without overriding network logic. For any activity, drift plus float equals total float.

early (late) dates: earliest (latest) dates an activity may start/finish or a milestone may occur, as determined by the CPM forward pass (backward pass) and the GPM algorithms.

embedded node: a logic event intermediate of, or right on, the start or finish node of an activity through which the activity is linked to another activity, a milestone, or a benchmark.

finish child: source activity that sets the finish date of the parent activity grouping it (allowing for a tie-breaking rule).

finish-to-finish (FF): a link or relationship type wherein finish of the predecessor activity allows a stated remaining portion of the successor activity to proceed to completion.

finish-to-start (FS): a link or relationship type wherein finish of the predecessor activity and a waiting period aka lag, if any specified, allow the successor activity to start.

float: extent a positive-drift activity may be delayed beyond planned dates and not extend project completion; float equals total float for activities on early times.

fragnet: a selected group of activities and interconnecting logic links in a schedule.

gap, link gap: for two linked objects, extent the predecessor may be delayed and not impact the successor and the successor may gain schedule and not impact the predecessor.

graphical path method (GPM): planning/scheduling method that serves as the engine behind graphical and visualization applications that, without a CPM forward pass or backward pass, recalculates the schedule and refreshes the schedule graph only where impacted, synchronously as a user manipulates activities, links, milestones, and benchmarks. Allowing activities to be scheduled on planned dates while retaining the ability to drift, GPM calculates gaps, which are used to calculate late dates and floats. Total floats and the as-built critical path/s are calculated left of the data date.

grouping activity: activity that summarizes higher-density activities associated with the corresponding WBS package, hammock, level code, or other grouping code established in the source schedule for the purpose of creating lower-density, summarized activities.

hammock: summary object grouping source activities that "hangs" from a start and a finish child and that spans between the start child start date and the finish child finish date.

intermediate child: source activity that is neither the start nor finish child of its parent.

kinetic interface: display that refreshes the displayed schedule in real time by recalculating activity, milestone, and benchmark date and float attributes in response to—and synchronously with—the physical manipulation of network objects by a user on the digital canvas.

link or logic tie: network object drawn on the digital canvas as a directed edge line connecting two activities, an activity and a milestone or benchmark, two milestones, or a milestone and benchmark; dependency between two schedule objects, with or without an embedded node, and with or without a lag.

middle child: intermediate child with less total float than both the start child and finish child (allowing for a tie-breaking rule).

milestone: network object denoting a start or completion instant event that, if linked and unrestrained by a date constraint, is controlled by the start or finish time of its linked activities.

network: flow graph of the schedule comprising rule-encoded activities, embedded nodes, milestones, and benchmarks that are linked by designated predecessor-successor links.

network schedule objects (also objects or network objects): activities, logic ties, milestones, and benchmarks that are interconnected in a logic network.

parent: activity in an interactively and automatically generated higher-level schedule, corresponding to a grouping activity, spanning from its start child start date and finish child finish date, and that is linked through sum-up links to/from successor/predecessor parents.

parent overall duration: working days between parent start and finish date.

parent net duration: overall duration, less any gap periods.

rheonomic network: network schedule flow graph with a time-scaled layout. The opposite is a scleronomic network that lays out activities without considering time as a variable.

source schedule: highest-density graphical network schedule of detailed activities interconnected with logic ties and that, by virtue of their association with grouping activities, underlie parent activities forming at the corresponding level of indenture.

start child: source activity that sets start date of the parent activity grouping it (allowing for a tie-breaking rule).

start-to-finish (SF): a link or relationship type wherein completing a stated portion of the predecessor activity (aka start offset) allows a stated remaining portion of the successor activity (aka finish offset) to proceed.

start-to-start (SS): a link or relationship type wherein completing a stated start portion of the predecessor activity allows the successor activity to start.

sum-up or sum-up logic: links between parent activities created algorithmically from the links between the child activities contained within the parent activities; visually, on the digital canvas, child activities "snap" into the parent activity of the next lower-density level as the timescale or grid spacing is gradually compressed such that the child activities are no longer individually visually present, and the child activities "snap" out of the parent activities of the lower-density level as the timescale or grid spacing is gradually stretched such that the child activities are again individually visually present on the digital canvas.

total float (TF): extent an activity may be delayed beyond early dates and not delay completion; also, combined extent an activity on planned dates may be delayed and gain schedule and neither delay completion nor force an earlier project start or interim release date, respectively.

zooming in: swapping the schedule or fragnet on the canvas to a higher-density concordant network schedule or fragnet counterpart; zooming out is the opposite of zooming in.

The disclosed examples may include or may be implemented in a scheduling system that has one or more microprocessors or modules that are configured to operate with a screen display and graphical user interface. The microprocessor may include software, hardware, or both, and may be further subdivided or combined in one or more other microprocessors, control modules, or the like. The scheduling system is operable to execute a computer application encoded in non-transitory, computer-readable media. The application contains instructions that, when executed, are operable to carry out the methodologies and functions described in this disclosure. Thus, the system or module is understood to incorporate the capabilities of the application, and the application is understood to incorporate the methodologies and functions herein.

The system may be implemented in one or more computer programs executing on one or more programmable systems comprising at least one processor and at least one data storage system. Each program may be implemented in any desired computer language to communicate with a computer system. The system may also include a computing network that enables communication and exchange of data, including any communication method by which information may travel between computing devices. The network may include one or more of a wireless or wired network, a local or wide area network, a direct connection such as through a Universal Serial Bus port, and the set of interconnected networks that make up the Internet, an intranet, or other distributed computing network.

Schedulers most often focus their efforts on massive project network schedules at a level 3/4 degree of detail, useful for resource allocation and coordinating activities in the field, but too complex for non-scheduling stakeholders more concerned with work sequencing strategies than detailed, tactical planning. To make a point, as a rule of thumb, for construction contracts ranging $50 M-$250 M, schedulers focus their efforts on the detailed (level 3)

schedule typically comprising 175 to 350 activities per $10 M in contract value (i.e., 5,000 activities for a $250 M contract).

Where the software used to generate the detailed schedule does not automatically generate summarized logic ties at the appropriate level of detail, schedulers have little choice but to manually cobble summary schedules from massive detailed schedules when (a) visually explaining to stakeholders schedule issues needing resolution; (b) building summarized schedule models for risk assessments; (c) performing delay analyses; (d) engaging stakeholders in replanning to recover delay; and (e) attaching a summary schedule in monthly progress reports. Often, the creation of summary schedules must be repeated if the source schedule is revised. Additionally, as there is no standard, these manually generated schedule summaries often differ between schedulers.

The meaning of "detailed" and "summary" in terms of a complex schedule has evolved along two parallel tracks. One approach is to classify a schedule via hierarchical level. Level 1 (top of the pyramid) is the highest level, and level 5 (bottom) is the lowest level, where "higher" level means less detail. A second approach is to classify a schedule by its density, where level 1 is the lowest density and "lower" density means less detail of individual activities. Higher-level schedules portray less detailed activities. A level 1 schedule is the most summarized network schedule and a level 4 schedule is the most detailed network schedule. Higher-level schedules are lower-density schedules. A level 1 schedule is the lowest-density schedule and a level 4 schedule is the highest-density network schedule. Schedule levels 1-3 portray the entire scope of the project; a level 4 schedule often expands a portion of the level 3 schedule activities by areas, trades, or systems.

The present disclosure provides a strategy for interactive and automated summarized schedules on a digital canvas, including a hierarchy of logic-tied schedule densities generated from a source (highest-density) schedule with the ability in real time to zoom in/out among schedule densities. For example, logic-tied lower-density schedules interactively and automatically snap onto the canvas in real time as the timescale or grid spacing is gradually compressed. Conversely, logic-tied higher-density schedules snap back onto the digital canvas interactively and automatically in real time as action on the digital canvas reverts to gradually stretching the timescale or grid spacing.

Further, it is possible to navigate between saved schedule hierarchical levels. For example, to zoom out, it is possible to use the graphic tool to swap the schedule on the canvas to a lower-density schedule, click on – (minus) on a +/– tool, or use the auto zoom-out feature. To zoom in, it is possible to use the graphic tool to swap the schedule on the canvas to a higher-density schedule, click on + (plus) on the +/– tool, or use the auto zoom-in feature.

In hammock charts, activity vertical (date) integration is assured because earliest start dates and latest finish dates of underlying activities sum up to hammock activities' early start dates and late finish dates. Vertical integration, however, does not require that links between detailed activities sum up to hammock activities. Concordance requires both vertical and horizontal integration. Early start dates, late finish dates, drifts, floats, total floats, links, gaps, critical/near-critical paths, benchmarks, and milestones sum up in concordant summarized network schedules.

The present disclosure allows a flexible density zooming scheme (WBS packages, hammocks, et al. with multiple levels of indentures) or clusters underlying parent activities. While a one-to-one link between summary groups and schedule levels is common, zooming out or zooming in to a hierarchical schedule level as the timescale or grid spacing is gradually compressed or stretched using a WBS layout requires stating which WBS level corresponds to which schedule level.

An application based on the present disclosure may employ a density zooming-interface permitting a user, for example, to: (a) modify hierarchy levels and sections in the graphic tool; (b) search for missing links and link source activities with an open start and/or open finish; (c) search for orphan activities and assign any orphan source activity to the appropriate summary group; (d) assign to each parent the working day calendar of its start child or user-designated child; (e) code source milestones and benchmarks to summary groups; and/or (f) for swim lanes, associate WBS packages with schedule levels (e.g., WBS level 3 corresponds to the level 1 schedule).

The present disclosure allows a flexible density zooming concordant activity integration algorithm, by way of example: (a) generating parent activities based on whichever summary group is the selected vertical integration scheme; (b) making parent start and finish dates falling left of the data date actual dates; (c) for every parent, the source activity with the earliest early start date, or if two or more such source activities share the earliest early start date, the source activity/ies of least total float) is/are the start child/children; (d) for every parent, the source activity with the latest early finish date, or if two or more such source activities share the latest early finish date, the source activity/ies of least total float is/are the finish child/children; (e) the least-gap predecessor/sand least-total-float predecessor/s are associated with each start child; (f) the least-gap successor/s and least-total-float successor/s are associated with each finish child; (g) for every parent with a middle child, the least-total-float predecessor and least-total-float successor are associated with the middle child; and (h) for every parent, notable intermediate child/children, if any, is/are identified. Further, on request, each parent's start child, finish child, and middle child, and associated sum-up links are displayed on a spreadsheet.

The density zooming concordant logic tie algorithm generates in the lower-density schedule primary key links from the source schedule, as identified by the concordant activity integration algorithm, comprising links between a parent start child, finish child, or intermediate child and another parent start child, finish child, or intermediate child. For the eight sum-up link combinations among a parent's start, finish, and intermediate child and another parent start, finish, and intermediate child, and FS, SS, and FS links in the source schedule, twenty-four sum-up logic patterns may arise. FIG. 3 shows twelve logic patterns where a parent start or finish child is linked to/from another parent start or finish child. As SF links are typically not used in the source schedule and are assumed disfavored in algorithmically generated summary schedules, FIG. 4 shows an SF logic avoidance algorithm where a parent start or finish child is linked to/from another parent start or finish child to avoid SF links. FIGS. 5-8 illustrate graphs of the twelve sum-up logic patterns. That is, the graphic display of the selected sum-up logic pattern reflects the underlying logic.

FIG. 9 shows the twelve sum-up logic patterns that arise where a parent start or finish child is linked to/from another parent intermediate child. FIG. 10 shows a spreadsheet with the SF logic avoidance algorithm where a parent start or finish child is linked to/from another parent intermediate child. FIGS. 11-14 graph each of the respective twelve sum-up logic patterns corresponding to a start or finish child linked to/from another parent intermediate child.

A link from a parent intermediate child to another parent intermediate child is only relevant if one intermediate child is also a middle child or both intermediate children are middle children. FIG. 15 shows that the three logic patterns from/to a parent middle child and another parent intermediate child all sum up as SF links. FIG. 16 illustrates the SF avoidance algorithm.

The present disclosure utilizes a sum-up logic algorithm comprising the following processes: (a) sorting parent activities by early start date (ascending order); (b) in summing up key links, allowing the option to ignore links with gaps exceeding a gap threshold; (c) generating sum-up links where a parent start child or finish child is linked to/from another parent start child or finish child; (d) generating key primary sum-up links where a parent start child or finish child is linked to/from another parent intermediate child; and (e) generating key secondary sum-up links where a parent middle child is linked to/from another parent intermediate child.

In the present disclosure, as the timescale or grid spacing is gradually compressed, displayed fragnets, when no longer discernible, auto zoom out into (i.e., snap into) the next lower-density schedule activity or fragnet. If action on the timescale or grid spacing changes to stretching, as previously zoomed-out activities or fragnets once again become discernible, they zoom back in (i.e., snap out of) from the lower-density schedule to their originating higher-density fragnets.

Figure 17:
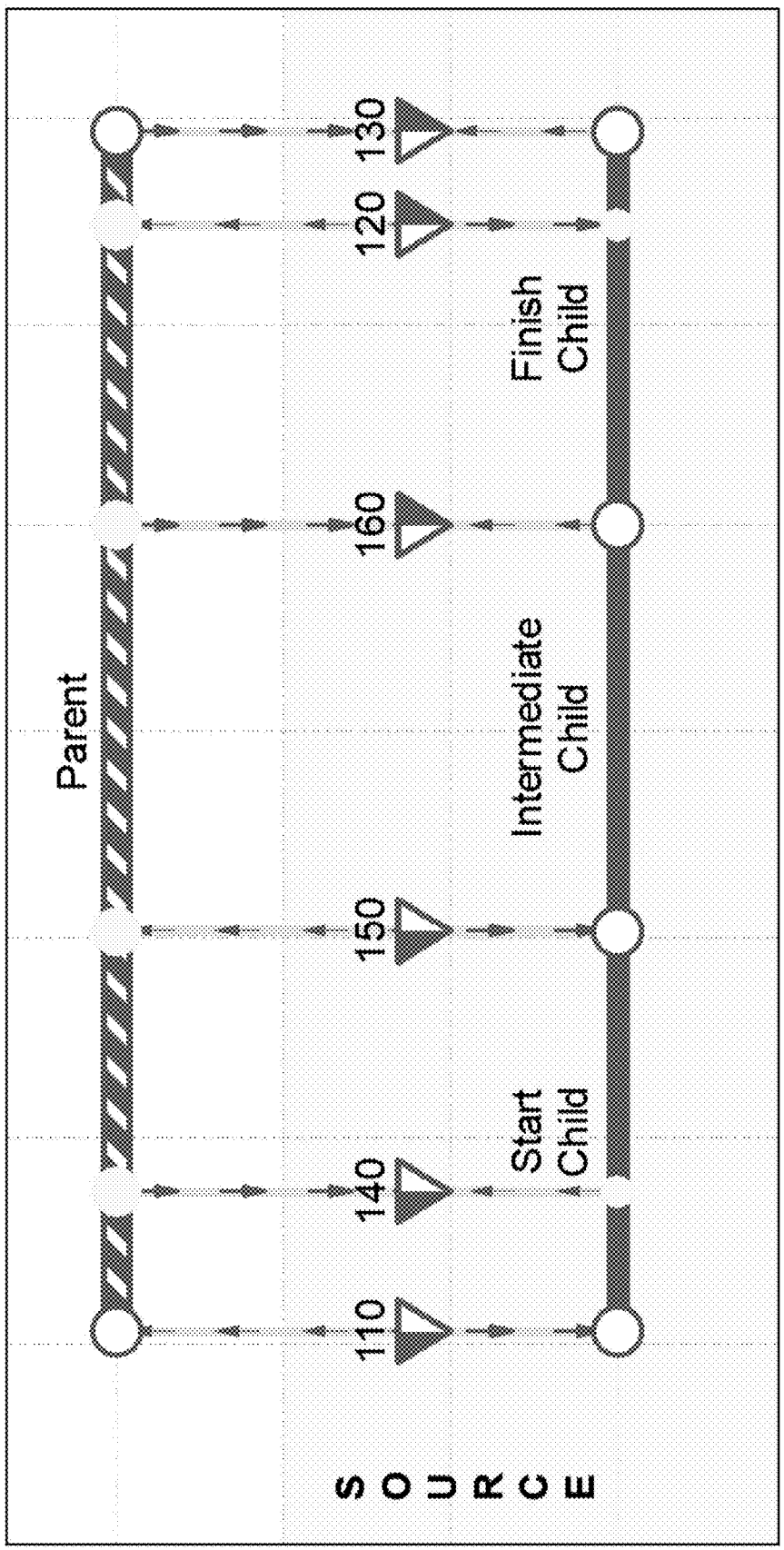
FIG. 17 is an example block diagram detailing sum-up links for milestones and benchmarks.

FIG. 17 diagrams an example process of the zoom-up milestone and benchmark processor. At 110, a source schedule event preceding a start child is linked to the start of the parent. At 120, a source schedule event preceding a finish child is linked to a finish embed that is offset the finish child duration from the parent's finish such that sum-up gap equals source gap. At 130, a source schedule event succeeding a finish child is linked from the finish of the parent. At 140, a source schedule event succeeding a start child is linked to an embed that is offset the start child duration from the parent's start, such that sum-up gap equals source gap. At 150, a source schedule event preceding an intermediate child is linked to an embed in the parent at the start of the intermediate child, such that sum-up gap equals source gap. And at 160, a source schedule event succeeding an intermediate child is linked from an embed in the parent at the finish of the intermediate child, such that sum-up gap equals source gap.

In further examples, the present disclosure allows the following zoom options: (a) display parent overall duration, net duration, or both; (b) calculate minimum total float for parent activities; (c) within any parent bar, highlight the duration, and when hovering the pointer over the bar, display the description of the middle child, if any, and the description of any intermediate child with duration≥40% of the parent net duration; (d) display parent activity bar "necked" during gap periods; (e) set critical path total float threshold and parent bar color (e.g., red if TF≤5) and near-critical path total float threshold and bar color (e.g., yellow if TF≤20); and (f) apply color, if any, to every child, in whichever parent subsumed, that is a critical activity in the source schedule.

In a further embodiment of any of the foregoing examples, the method includes: from a source network schedule, algorithmically generating summary and intermediate concordant network schedules or the next-higher-level concordant network schedule as the timescale or grid spacing is compressed or as clusters are selected, rendering navigating between schedule levels effortless. Summarized activities (aka parents) group source activities according to the selected vertical integration scheme (e.g., WBS packages, hammocks, etc.). For any parent, the activity with the earliest early start date (tie-breaking rule included) is the start child, the activity with the latest early finish date (tie-breaking rule included) is the finish child, and the intermediate activity with less total float than the start child and finish child (tie-breaking rule included), if any, is the middle child. The method associates with each start child its key predecessor/s (e.g., least-gap predecessor and/or least TF predecessor), with each finish child, its key successor/s (e.g., least-gap successor and/or least TF successor), and with each middle child, its key predecessor and key successor (e.g., least TF).

In a further embodiment of any of the foregoing examples, the method includes: a user-interaction feature acting on a graphic tool with a section per schedule level (each section denoting existence or not of a schedule at that level and whether original or zoomed up) is used to generate a zoomed-up schedule.

In a further embodiment of any of the foregoing examples, the method includes: with a source network schedule on the canvas, as the timescale or grid spacing is compressed and then stretched, and activity/logic detail is no longer discernible or once again discernible, algorithmically generating and swapping display to the next-higher-level fragnet and then reverting to the next lower-level source fragnet.

In a further embodiment of any of the foregoing examples, the method includes: algorithmically generating and displaying the selected lower-density schedule, in whole or in part, as clusters are selected.

In a further embodiment of any of the foregoing examples, the method includes: navigating between schedule levels as the timescale or grid spacing is compressed and then stretched, navigating by using the graphic tool, and navigating through a zoom-out (−) and zoom-in (+) graphic feature docked on the canvas.

In a further embodiment of any of the foregoing examples, the method includes, by way of example: preceding zooming up by linking unlinked source activities, ignoring source links based on a gap threshold, assigning to each parent the calendar of its start child or allowing input instead, coding any orphan source activity to the appropriate zooming-up scheme, and relating WBS levels and schedule levels.

In a further embodiment of any of the foregoing examples, the method includes: algorithmically generating sum-up links where (a) a start child or finish child is linked from/to another parent start child or finish child; (b) a start child or finish child is linked from/to another parent intermediate child; and (c) a middle child is linked to/from another parent intermediate child. If source schedule link types include finish-to-start, start-to-start, and finish-to-finish logic, the method generates a sum-up link as finish-to-start, start-to-start, finish-to-finish, or start-to-finish, and ensures sum-up gaps equal the respective source gaps. To avoid sum-up start-to-finish links, the method splits the predecessor parent into a start parent and a finish parent, finish-to-start links the start parent to the finish parent, and finish-to-finish links the start parent to the successor parent.

In a further embodiment of any of the foregoing examples, the method includes: for milestones and benchmarks that sum up to a schedule level, algorithmically generating sum-up links, where (a) each event preceding a start child is linked to the start of the parent; (b) each event preceding a finish child is linked to an embed that is offset the finish child duration from the parent activity's finish date, such that sum-up gap equals source gap; (c) each event succeeding a finish child is linked from the finish date of the parent; (d) each event succeeding a start child is linked to an embed that is offset the start child duration from the parent start, such that sum-up gap=source gap; (e) each event preceding an intermediate child is linked to an embed in the parent offset at the start date of the intermediate child, such that sum-up gap equals source gap; and (f) each event succeeding an intermediate child is linked from an embed in the parent offset at the finish date of the intermediate child, such that sum-up gap equals source gap.

In a further embodiment of any of the foregoing examples, the method includes: where any two schedules are original schedules, comparing a manually updated higher-level schedule to a "what-if" zoomed-up update of the lowest-level original schedule and highlighting non-concordant attributes for corrective action.

In a further embodiment of any of the foregoing examples, the method includes: distinguishing between parent overall duration and net duration; calculating minimum float for parent activities; when hovering with the mouse over a parent, highlighting duration and displaying the description of any middle child and any intermediate child with duration≥40% of the parent net duration; displaying activity bar necked for gap periods; and setting critical path and near-critical path total float threshold colors.

In a further embodiment of any of the foregoing examples, the method includes: generating and displaying concordant summary and intermediate schedules, at designated schedule levels, or as the timescale or grid spacing is compressed or as clusters are selected.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or in all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art who do not necessarily depart from this disclosure. The scope of legal protection given to this disclosure can only be determined by studying the following claims.

What is claimed is:
1. A method comprising:
converting source child activities of a source network schedule of graphical schedule objects into an interactive and transposable summarized schedule that has a hierarchy of schedule densities on a time-scaled graph and displayable on a digital canvas, the hierarchy of schedule densities having hierarchy levels each including parent activities, each parent activity is a sum up of an associated group of the child activities, which may include the parent activities of a lower one of the hierarchy levels, and the parent activities are visually logic tied to each other on the digital canvas; and
zooming in and zooming out on the time-scaled graph among the hierarchy of schedule densities on the digital canvas, wherein as the time-scaled graph is time compressed (zoom out), the source child activities snap into parent activities of a higher one of the hierarchy levels such that the source child activities become visually non-present on the digital canvas and the parent activities of the higher one of the hierarchy levels becomes visually present on the digital canvas, and as the time-scaled graph is time-stretched (zoom in), the source child activities that are associated with the parent activities of the hierarchy level that is currently visible on the digital canvas snap out of the parent activities and become visually present on the digital canvas and the parent activities become visually non-present.

2. The method as recited in claim 1, wherein each group of the source child activities is mutually exclusive.

3. The method as recited in claim 1, further comprising a user graphic tool with sections representing each of the hierarchy of schedule densities, each said section denoting existence or not of an interactive summarized schedule for each of the hierarchy of schedule densities, and further comprising permitting a user to navigate among the hierarchy of schedule densities using the multilevel graphic tool, including a zoom out (−) and zoom in (+) graphic feature on the digital canvas.

4. The method as recited in claim 1, further comprising permitting a user to navigate among the hierarchy of schedule densities using the multilevel graphic tool, including a zoom out (−) and zoom in (+) graphic feature on the digital canvas.

5. The method as recited in claim 1, wherein for each of the parent activities, there is a start child activity that is the one of the source child activities of the parent activity and that has an earliest early start date, or if two or more of the source child activities of the parent activity share the earliest early start date, the one of the two or more the source child activities of the parent activity that has a least total float, there is a finish child activity that is the one of the source child activities of the parent activity with a latest early finish date, or if two or more of the source child activities of the parent activity share the latest early finish date, the one of the two or more of the child activities that has a least total float, and the other one of the source child activities of the parent activity, if any, that has a lower total float than both the start child activity and finish child activity, or if two or more of the source child activities of the parent activity are of a lower total float than both the start child activity and finish child activity, the one of the two or more source child activities of the parent activity that has a least total float is a middle child activity, and associating with the start child activity from predecessor source activities of the start child activity the one of the source predecessor activities of least-gap and the one of the source predecessor activities of least-total-float, associating with the finish child activity from successor source activities of the finish child activity the one of the source successor activities of least-gap and the one of the source successor activities of least-total-float, and associating with the middle child activity, if existing, from source predecessor activities of the middle child activity the one of the predecessor activities of least total float and from source successor activities of the middle child activity the one of the successor activities of least total float.

6. The method as recited in claim 5, further comprising permitting a user to link, in the source network schedule, any unlinked ones of the source child activities, ignore the link of any of the source child activities based on a stated gap threshold, assign to each of the parent activities a calendar of the start child activity or allow the user to input instead, and code any orphan ones of the source child activities to one of the groups of child activities.

7. The method as recited in claim 5, wherein the start child activity or the finish child activity of one of the parent activities is linked with the start child activity or the finish child activity of another one of the parent activities.

8. The method as recited in claim 5, wherein the start child activity or the finish child activity of one of the parent activities is linked with the middle child activity of another one of the parent activities.

9. The method as recited in claim 5, wherein the middle child activity of one of the parent activities is linked with the middle child activity of another of the parent activities.

10. The method as recited in claim 5, comprising converting any finish-to-start logic ties, start-to-start logic ties, and finish-to-finish logic ties among the start child activity, finish child activity, and middle child activity of one of the parent activities and the start child activity, the finish child activity, and the middle child activity of another of the parent activities to a selected sum-up logic type and an offset/lag between the parent activities.

11. The method as recited in claim 10, wherein each of the source child activities that precedes the finish child activity of one of the parent activities is linked with the finish-to-finish logic tie or the start-to-finish logic tie with an embed/s offset such that a sum-up logic gap equals a link gap between the child source activities.

12. The method as recited in claim 10, wherein each of the source child activities that precedes the start child of one of the parent activities is linked with the finish-to-start logic tie, the start-to-start logic tie, the finish-to-finish logic tie, or the start-to-finish logic tie with an embed/s offset such that a sum-up logic gap equals a link gap between the source child activities.

13. The method as recited in claim 10, wherein each of the source child activities that precedes the intermediate child of one of the parent activities is linked with finish-to-finish or start-to-finish logic with an embed/s offset such that a sum-up logic gap equals a link gap between the child activities.

14. The method as recited in claim 10, wherein each of the source child activities that is preceded by the intermediate child of one of the parent activities is linked with start-to-finish logic or start-to-start logic with an embed/s offset such that a sum-up logic gap equals a link gap between the child activities.

15. The method as recited in claim 10, wherein, to avoid start-to-finish sum-up links, the parent activity is split into start and finish parent activities connected by finish-to-start sum-up logic and the finish parent activity is linked with finish-to-finish sum-up logic to the successor parent activity.

16. The method as recited in claim 10, wherein the sum-up logic gap between two of the parent activities equals a gap on a link between the two of the source child activities of the parent activities.

17. The method as recited in claim 5, further comprising distinguishing between overall duration of the parent activities in working days between a parent start date and a parent finish date and a parent net duration of a difference between overall duration and any gap periods, calculating a minimum total float for each of the parent activities, on the digital canvas highlighting the overall duration, and when hovering with cursor over one of the parent activities, displaying a description of the middle child activity, if any, and the description of any of intermediate activities of the parent activity with a duration of greater than or equal to 40% of the parent net duration, for each of the parent activities displaying on the digital canvas a parent activity bar, wherein the parent activity bar is necked for gap periods.

18. A schedule system comprising:

at least one processor;

a source network schedule of graphical schedule objects and that includes source child activities that is convertible into an interactive and transposable summarized schedule that has a hierarchy of schedule densities on a time-scaled graph and displayable on a digital canvas, the hierarchy of schedule densities having hierarchy levels each including parent activities, each parent activity is a sum up of an associated group of the child activities, which may include the parent activities of a lower one of the hierarchy levels, and the parent activities are visually logic tied to each other on the digital canvas; and the interactive and transposable summarized schedule is time-stretchable to zoom in and zoom out on the time-scaled graph among the hierarchy of schedule densities on the digital canvas, wherein as the time-scaled graph is time compressed (zoom out), the source child activities snap into parent activities of a higher one of the hierarchy levels such that the source child activities become visually non-present on the digital canvas and the parent activities of the higher one of the hierarchy levels becomes visually present on the digital canvas, and as the time-scaled graph is time-stretched (zoom in), the source child activities that are associated with the parent activities of the hierarchy level that is currently visible on the digital canvas snap out of the parent activities and become visually present on the digital canvas and the parent activities become visually non-present.

19. The schedule system as recited in claim 18, further comprising a user graphic tool with sections representing each of the hierarchy of schedule densities, each said section denoting existence or not of an interactive summarized schedule for each of the hierarchy of schedule densities.

* * * * *